United States Patent [19]

Shimizu et al.

[11] Patent Number: 4,722,968

[45] Date of Patent: Feb. 2, 1988

[54] METHOD FOR PREPARING CURED ORGANOPOLYSILOXANE COMPOSITIONS

[75] Inventors: Koji Shimizu; Mitsuo Hamada, both of Chiba, Japan

[73] Assignee: Toray Silicone Co., Ltd., Tokyo, Japan

[21] Appl. No.: 14,563

[22] Filed: Feb. 13, 1987

[30] Foreign Application Priority Data

Mar. 4, 1986 [JP] Japan .................................. 61-47127

[51] Int. Cl.$^4$ ............................................. C08L 83/04
[52] U.S. Cl. .................................... 524/862; 524/588; 524/789; 524/861; 528/15; 528/31; 528/32; 528/21; 528/23

[58] Field of Search ...................... 528/15, 31, 32, 21, 528/23; 524/588, 789, 861, 862

[56] References Cited

U.S. PATENT DOCUMENTS 4,162,243 7/1979 Lee et al. ..................... 260/37 SB
4,595,739 6/1986 Cavezzan ............................. 528/15

Primary Examiner—Melvyn I. Marquis
Attorney, Agent, or Firm—Robert Spector

[57] ABSTRACT

Addition curable organopolysiloxane compositions are blended and cured within specified temperature ranges to obtain cured articles that are free of bubbles and exhibit a smooth, glossy exterior surface.

5 Claims, No Drawings

METHOD FOR PREPARING CURED ORGANOPOLYSILOXANE COMPOSITIONS

BACKGROUND OF THE INVENTION

1. Field of the Invention

This invention relates to a method preparing cured organopolysiloxane compositions. More specifically, this invention relates to a method for preparing cured organopolysiloxane compositions during which bubbles are not generated during curing, and which provides a cured product having an excellent surface gloss and surface smoothness.

2. Description of the Prior Art

It is known that organopolysiloxane compositions principally constituted of organopolysiloxane having silicon bonded alkenyl radicals and organohydrogenpolysiloxane having silicon bonded hydrogen atoms can be cured to form rubbery cured silicone materials by an addition reaction conducted in the presence of a noble metal from Group IV of the Periodic Table, for example, platinum, rhodium, palladium or compounds of these metals. Furthermore, it is also known that such organopolysiloxane compositions can be liquid and that, when injected or transferred into various metal molds and heated under elevated pressure, these liquid compositions are rapidly cured to silicone rubber products with an excellent mechanical strength.

U.S. Pat. No. 4,162,243, which issued to Lee et al on June 24, 1979, describes curable liquid organopolysiloxane compositions comprising a vinyl-containing polydiorganosiloxane of specified molecular weight distribution, an organohydrogenpolysiloxane and a platinum hydrosilation catalyst. In accordance with the examples of this patent the ingredients of the curable composition are blended together at ambient temperature and the compositions are cured at temperatures above 100 degrees C.

Many of the methods for preparing and curing organopolysiloxane compositions that are described in the prior art include use of an optional or required catalyst inhibitor for retarding the rate of the addition reaction at ambient temperature.

These prior art compositions suffer from several problems as a consequence of the addition of a small or extremely small quantity of a catalyst inhibitor to the aforementioned starting materials, followed by mixing of the resultant compositions at room temperature or higher temperatures, and curing of the compositions at temperatures at of 120 degrees C. or above. These problems result from air or volatile components that become trapped within the organopolysiloxane composition or metal mold. This entrapped material undergoes thermal expansion upon heating and the cured product in many cases contains extremely small bubbles in the interior or at the surface. As a result, a uniform cured silicone product with excellent physical properties often cannot be produced.

In addition to containing bubbles, the organopolysiloxane composition itself undergoes thermal hysteresis due to its thermal expansion generating irregularities on the surface of the cured product and thus preventing the production of a cured silicone product with a smooth and glossy surface.

Various methods were examined by the present inventors in order to find a method for curing organopolysiloxane compositions which would not suffer from these problems. The invention was developed as a consequence of the finding that the aforementioned problems could be substantially eliminated by mixing and curing the ingredients of a curable organopolysiloxane composition under specific temperature conditions.

An object of the present invention is to provide a method for preparing cured organopolysiloxane compositions in which bubbles are not generated and which produces a cured silicone elastomer product with excellent surface gloss and surface smoothness.

SUMMARY OF THE INVENTION

Addition curable organopolysiloxane compositions are blended and cured within specified temperature ranges to obtain cured articles that are free of bubbles and exhibit a smooth, glossy exterior surface.

DETAILED DESCRIPTION OF THE INVENTION

This invention provides a method for preparing a cured organopolysiloxane composition comprising the consecutive steps of I. blending to homogeniety at a temperature of from −60 degrees to +5 degrees C. a mixture of ingredients comprising
  (A) an organopolysiloxane having at least 2 lower alkenyl radicals in each molecule,
  (B) an organohydrogenpolysiloxane having at least 2 silicon-bonded hydrogen atoms in each molecule and which does not contain alkenyl radicals, and
  (C) an amount of a platinum-type catalyst equivalent to from 0.1 to 1,000 parts by weight of a platinum group metal per million parts of combined weight of ingredients (A) and (B).
wherein the sum of the number of alkenyl radicals in each molecule of ingredient (A) and the number of silicon-bonded hydrogen atoms in each molecule of ingredient (B) is at least 5; and
II. heating the resultant curable mixture at a temperature within the range of from +25 degrees C. to +100 degrees C. for a sufficient time to form said cured composition.

The various ingredients of the curable organopolysiloxane compositions prepared using the present method will now be explained in detail. The alkenyl substituted organopolysiloxane, identified hereinafter as ingredient A, is the principal ingredient of the curable organopolysiloxane composition. This ingredient is cured by an addition reaction with the organohydrogenpolysiloxane (ingredient B) in the presence of a catalyst, identified hereinafter as ingredient C.

Ingredient A must contain at least 2 silicon-bonded lower alkenyl radicals in each molecule. When less than two lower alkenyl radicals are present, a network structure cannot be formed and a good cured product therefore cannot be produced. These lower alkenyl radicals are exemplified by vinyl, allyl and propenyl, and are preferably vinyl. The lower alkenyl radicals can be present at any position in the molecule, but preferably are present at least at the ends of the molecule. The molecular structure of this ingredient may be straight chain, branchcontaining straight chain, cyclic, network or 3-dimensional; however, a straight chain, possibly with slight branching, is preferred.

The molecular weight of ingredient A is not specifically restricted and encompasses both low-viscosity liquids and very high-viscosity gums. A minimum viscosity at 25 degrees C. of about 0.1 Pa.s is preferred in order to obtain a rubbery cured elastomer.

The silicon-bonded hydrocarbon radicals other than the aforementioned lower alkenyl radicals that are present in ingredient A are preferably methyl, phenyl, 3,3,3-trifluoropropyl or combinations of these three radicals. Ingredient A is most preferably a vinyl-terminated diorganopolysiloxane.

Ingredient A is exemplified by methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers trimethylsiloxy-terminated dimethylsiloxanemethylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers and polysiloxanes composed of $CH_2=CH(CH_3)_2SiO_{\frac{1}{2}}$, $(CH_3)_3SiO_{\frac{1}{2}}$ and $SiO_{4/2}$ units. A combination of 2 or more of the aforementioned organopolysiloxanes may be used in the present invention.

Ingredient B of the present curable compositions is the crosslinker for ingredient A. Curing is accomplished by an addition reaction between the silicon-bonded hydrogen atoms of ingredient B and the lower alkenyl radicals of ingredient A in the presence of the catalyst, ingredient C. Ingredient B must contain at least 2 silicon-bonded hydrogen atoms in each molecule in order to act as a crosslinker.

The sum of the number of alkenyl radicals groups in each molecule of ingredient A and the number of silicon-bonded hydrogen atoms in each molecule of ingredient B must be at least 5. When this sum is less than 5 a network structure essentially cannot be formed and a good cured product accordingly cannot be produced.

The molecular structure of ingredient B is not specifically restricted, and it can be straight chain, branch-containing straight chain or cyclic. The molecular weight of this ingredient is not specifically restricted, however the viscosity of this ingredient at 25 degrees C. is preferably from 0.001 to 50 Pa.s in order to obtain good miscibility with ingredient A.

The concentration of ingredient B in the present curable compositions is preferably such that the molar ratio of the total number of silicon-bonded hydrogen atoms in this ingredient and the total number of all lower alkenyl radicals in ingredient A is from 0.5:1 to 20:1. A molar ratio below 0.5:1 will not give a good curability, while a molar ratio exceeding 20:1 causes an increase in hardness when the cured product is heated. Furthermore, when an alkenyl radical-containing organopolysiloxane which does not correspond to ingredient A is added as an optional ingredient in order to obtain, for example, a low-modulus cured product, a supplemental amount of ingredient B sufficient to react with the alkenyl radicals present in the optional ingredient is preferably added to the curable composition. Ingredient B is preferably a monoorganohydrogensiloxane/diorganosiloxane copolymer containing an average of at least three silicon bonded hydrogen atoms per molecule.

Concrete examples of ingredient B include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxanemethylhydrogensiloxane copolymers, dimethylsiloxanemethylhydrogensiloxane cyclic copolymers, copolymers composed of $(CH_3)_2HSiO_{\frac{1}{2}}$ and $SiO_{4/2}$ units and copolymers composed of $(CH_3)_3SiO_{\frac{1}{2}}$, $(CH_3)_2HSiO_{\frac{1}{2}}$ and $SiO_{4/2}$ units.

Ingredient C is a catalyst for the addition reaction between silicon-bonded hydrogen atoms and alkenyl radicals. This catalyst is a metal selected from the platinum group of the Periodic Table or a compound of one of these metals. Specific examples of such catalysts include but are not limited to chloroplatinic acid, alcohol or ketone solutions of chloroplatinic acid, these solutions after ripening, chloroplatinic acid-olefin complexes, chloroplatinic acid-alkenylsiloxane complexes, chloroplatinic acid-diketone complexes, platinum black and platinum metal on various supports.

The concentration of ingredient C in the present compositions is equivalent to from 0.1 to 1,000 parts of a platinum group metal per million parts by weight (ppm) of combined ingredients A and B. At concentrations below 0.1 ppm, the crosslinking reaction does not progress satisfactorily, while concentrations in excess of 1.000 ppm are uneconomical. A concentration of ingredient C equivalent to from about 1 to 100 ppm of platinum group metal is preferred for typical applications.

Organopolysiloxanes having one lower alkenyl radical or one silicon-bonded hydrogen atom in each molecule can be blended into the organopolysiloxane composition of the invention in order to reduce the modulus of the cured product and obtain a gel.

Reinforcing or non-reinforcing fillers for regulating the fluidity or improving the mechanical strength of the cured product can be blended into the curable organopolysiloxane composition of the present invention. Reinforcing fillers are exemplified by precipitated silica, fumed silica, calcined silica and fumed titanium oxide. Typical non-reinforcing fillers include pulverized quartz, diatomaceous earth, asbestos, aluminosilicic acid, iron oxide, zinc oxide and calcium carbonate. These fillers can be used as such, or they may be surface-treated with an organosilicon compound such as hexamethyldisilazane, trimethylchlorosilane or a hydroxyl terminated polydimethylsiloxane.

The curable compositions can include a small or very small quantity of an acetylene compound, a hydrazine, a triazole, a phosphine, a mercaptan or other additive for inhibiting the curing reaction, unless this additive adversely affects the object of the present invention. In addition, pigments, heat stabilizers, flame retardants and plasticizers can be admixed with the curable compositions as necessary.

One of the features that distinguishes the present method from the prior art is the requirement that ingredients A, B, and C together with any additional ingredients must be blended with one another at a temperature of from −60 degrees to +5 degrees C. This temperature is preferably in the range of −30 degrees to 0 degrees C. Ingredients A and B used in the present invention tend to be gels at temperatures below −60 degrees C., which reduces the workability. The curing reaction that occurs during mixing at temperatures exceeding +5 degrees C. causes the moldability of the compositions to become poor.

In accordance with the method of this invention, the curable compositions are cured within the temperature range of from 25 degrees to 100 degrees C., preferably within the range of from 40 degrees to 75 degrees C. When this curing temperature falls below 25 degrees C., the rate of curing and productivity are both reduced. On the other hand, when this curing temperature exceeds 100 degrees C., bubbles are generated in the cured product, and the molded product is difficult to release from the metal mold when a metal mold is used in the curing operation.

The curing portion of the present method can be executed by combining a known mixer or mixing extruder with a cooling device.

In accordance with the method of this invention, the ingredients of an addition-curable organopolysiloxane composition are mixed at temperatures of from −60 degrees to +5 degrees C. and the resultant composition is cured at the relatively low temperatures of from 25 degrees C. to 100 degrees C. The characteristics of the resultant cured organopolysiloxane elastomers include an absence of bubbles within the cross section in addition to excellent surface gloss and smoothness.

The present method is applicable to various fabrication procedures, including compression molding, transfer molding, extrusion molding, dip molding, blow molding and coating to produce silicone rubber moldings and silicone rubber-coated products exhibiting excellent properties not available in the prior art.

The following examples describe preferred embodiments of the present method and should not be interpreted as limiting the scope of the present invention as defined in the accompanying claims. Unless otherwise indicated, all parts and percentages in the examples are by weight and viscosity values are measured at 25 degrees C.

EXAMPLE 1

Into 100 parts of a dimethylvinylsiloxy-terminated dimethylpolysiloxane with a viscosity of 0.5 Pa.s and a vinyl group content of 0.5 wt % were added and mixed 40 parts wet process silica (Nipsil LP from Nippon Silica Co., Ltd.) and 0.5 part of a trimethylsiloxy-terminated methylhydrogenpolysiloxane with a viscosity of 0.01 Pa.s and a SiH content of 1% to obtain a mixture (A) with a viscosity of 100 Pa.s at a shear rate of 10 sec$^{-1}$.

A second mixture (B) was prepared by adding and mixing 40 parts of the same wet process silica and 0.2 parts of an isopropyl alcohol solution of chloroplatinic acid containing 3% of platinum metal into 100 parts of the same dimethylpolysiloxane as in mixture A.

Mixtures A and B were each defoamed, and then fed at a constant ratio using metering pumps into a screw-type kneader which had been cooled to −20 degrees C. in advance, followed by blending to homogeneity to obtain a curable composition of this invention. This composition was extruded into a metal mold and compression molded at 50 degrees C. under a pressure of 2.45 MPa for a heating time of 5 minutes. The cured product was cut with a razor to expose a cross section. Inspection of the cross section using a microscope did not reveal any bubbles larger than one micron in diameter. Furthermore, release of the cured article from the metal mold was easy.

The physical properties of the cured article were measured with the following results: a hardness of 60, measured on the Shore A durometer scale, a tensile strength of 5.9 MPa and a tensile elongation at break of 250%.

For comparison, the same organopolysiloxane composition was extruded into the metal mold under the same conditions (−20 degrees C.) and compression molded at 150 degrees C. under a pressure of 2.45 MPa for 5 minutes. The cured article is examined for bubble generation as described in of the first part of this example. In this instance the presence 3 bubbles with diameters of 5 to 10 microns per square cm, of cross sectional area was confirmed. In addition, mold release from the metal mold was not as good as for the sample described in the first part of this example.

For comparative purposes an organopolysiloxane composition identical in composition to the other two described in this example was prepared. In this instance the aforementioned screw type extruder was not cooled, and the temperature within the extruder was 20 degrees C. The composition had already thickened when it was extruded into the metal mold. Also, the surface of the cured material obtained by curing by the same method as above was uneven, and the gloss was rated as poor.

EXAMPLE 2

Into 100 parts dimethylvinylsiloxy-terminated dimethylpolysiloxane with a viscosity of 1 Pa.s and a vinyl group content of 0.15 wt % were added and blended 30 parts dry process silica with a surface area of 200 m$^2$/g (Aerosil 200 from Nippon Aerosil Co., Ltd.) and 1.5 parts of a trimethylsiloxy-terminated methylhydrogenpolysiloxane with a viscosity of 0.012 Pa.s and a silicon-bonded hydrogen content of 0.9%. The resultant composition (mixture C) exhibited a viscosity of 700 Pa.s at a shear rate of 10 sec$^{-1}$.

100 Parts of the same dimethylpolysiloxane was also combined and blended with 30 parts of the same dry process silica described in the first paragraph of this example and with 0.2 parts of an isopropyl alcohol solution of chloroplatinic acid containing 3% platinum to obtain a mixture (mixture D) similar to the above.

Mixtures C and D were then each defoamed and fed at a uniform ratio using metering pumps into a screw-type kneader which had been cooled to −5 degrees C. in advance, and then mixed to homogeneity to obtain a curable composition of this invention. The cooled composition was then ejected onto the surface of a polyester sheet whose temperature was maintained at 40 degrees C. by continuously blowing on dried air at that temperature, and was then allowed to stand and cure under ambient conditions. The cured sheet of elastomer was then cut to reveal a cross section that was inspected for bubbles. No bubbles were observed within the cross section and the surface of the elastomer sheet was smooth and had good gloss. The physical properties of the cured sheet were measured with the following results: hardness (Shore A durometer scale)=45, tensile strength=6.9 MPa and tensile elongation at break=500%.

EXAMPLE 3

100 Parts of a methylphenylvinylsiloxy terminated dimethylpolysiloxane with a viscosity of 2 Pa.s, 7.0 parts of a trimethylsiloxy-terminated organohydrogenpolysiloxane with a viscosity of 0.01 Pa.s and composed of 50 mol % dimethylsiloxane units and 50 mol % methylhydrogensiloxane units, 50 parts quartz powder with an average particle size of 5 micrometers and 0.1 part of a 2-ethylhexyl alcohol solution of chloroplatinic acid with a platinum content of 2 wt % were all placed in a metal flask maintained at 0 degrees C. by a coolant circulation and blended to homogeneity to yield a curable composition of this invention. The metal flask was then placed in a desiccator maintained at 0 degrees C., and the pressure within the desiccator was reduced to defoam the mixture. A convex cylindrical aluminum mold (outside diameter 5 mm×length 105 cm) was immersed in the defoamed liquid mixture to a depth of 2 cm for 50 seconds, pulled out and maintained in a hot air oven at 50 degrees C. for 10 minutes. The resultant cured molded article was a cylindrical silicone rubber molding with a closed tip. The thickness of this molding is measured and is found to be uniformly 0.7 mm, and the surface is glossy and smooth. When this molding was cut with a blade, no bubbles were observed in the cross section.

EXAMPLE 4

A glass cloth was immersed for 1 minute in the organopolysiloxane composition of the preceding Example 3 and then removed while the temperature of the composition was maintained at 0 degrees C. Excess organopolysiloxane composition on the glass cloth was then pressed off and the glass cloth then placed in an oven maintained at 70 degrees C. for 5 minutes in order to obtain a silicone rubber-coated glass cloth. This silicone rubber layer did not contain bubbles in its interior and had a glossy and smooth surface.

That which is claimed is:

1. A method for preparing a cured organopolysiloxane composition comprising the consecutive step of
   I. blending to homogeniety at a temperature of from −60 degrees to +5 degrees C. a mixture of ingredients comprising
      (A) an organopolysiloxane having at least 2 lower alkenyl radicals in each molecule,
      (B) an organohydrogenpolysiloxane having at least 2 silicon-bonded hydrogen atoms in each molecule and which does not contain alkenyl radicals, and
      (C) an amount of a platinum-type catalyst equivalent to from 0.1 to 1.000 parts by weight of a platinum group metal per million parts of combined weight of ingredients (A) and (B).
      wherein the sum of the number of alkenyl radicals in each molecule of (A) and the number of silicon-bonded hydrogen atoms in each molecule of (B) is at least 5; and
   II. heating the resultant curable mixture at a temperature within the range of from 25 degrees to 100 degrees C. for a sufficient time to form said cured composition.

2. A method according to claim 1 where the lower alkenyl radicals are vinyl, allyl or propenyl, the remaining radicals present in said alkenyl substituted organopolysiloxane (A) and said organohydrogenpolysiloxane (B) are at least one of methyl, phenyl or 3,3,3-trifluoropropyl, and the organohydrogenpolysiloxane contains at least 3 silicon bonded hydrogen atoms per molecule.

3. A method according to claim 2 where (A) is a vinyl terminated diorganopolysiloxane exhibiting a viscosity of at least 0.1 Pa.s, (B) is a monoorganohydrogensiloxane/diorganosiloxane copolymer exhibiting a viscosity of from 0.001 to 50 Pa.s, the molar ratio of silicon bonded hydrogen atoms to lower alkenyl radicals present in the curable mixture is from 0.5 to 20, and the concentration of said catalyst is equivalent to from 1 to 100 parts by weight per million parts of combined weight of (A) and (B).

4. A method according to claim 3 where said curable composition contains a reinforcing or non-reinforcing filler, the temperature range for blending the ingredients of said curable mixture is from −30 to 0 degrees C., the temperature range for curing said mixture is from 40 to 75 degrees C., (A) is a dimethylvinylsiloxy terminated dimethylpolysiloxane or a methylphenylvinylsiloxy terminated dimethylpolysiloxane, (B) is a trimethylsiloxy terminated methylhydrogenpolysiloxane and the catalyst is chloroplatinic acid.

5. A method according to claim 4 where said filler is a wet- or dry process silica.

* * * * *